United States Patent
Line et al.

(10) Patent No.: US 12,208,716 B2
(45) Date of Patent: Jan. 28, 2025

(54) FLEXIBLE UPPER FRAME ADAPTER FOR TRADITIONAL BACK FRAME AND SEAT BACK ASSEMBLIES

(71) Applicant: FORD GLOBAL TECHNOLOGIES, LLC, Dearborn, MI (US)

(72) Inventors: Johnathan Andrew Line, Northville, MI (US); Benjamin Yilma, Canton, MI (US); Marcos Silva Kondrad, Macomb Township, MI (US); S M Akbar Berry, Lasalle (CA); Raed Essa El-Jawahri, Northville, MI (US); Kevin Michael Pline, Plymouth, MI (US); Jeffrey Charles Paddock, Dearborn, MI (US); Robyne McBride, Belle River (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 250 days.

(21) Appl. No.: 17/841,798

(22) Filed: Jun. 16, 2022

(65) Prior Publication Data
US 2023/0406177 A1 Dec. 21, 2023

(51) Int. Cl.
*B60N 2/68* (2006.01)

(52) U.S. Cl.
CPC ............ *B60N 2/682* (2013.01); *B60N 2/686* (2013.01)

(58) Field of Classification Search
CPC ........... B60N 2/682; B60N 2/686; B60N 2/58
See application file for complete search history.

(56) References Cited

U.S. PATENT DOCUMENTS

| | | | |
|---|---|---|---|
| 8,905,431 B1 * | 12/2014 | Line | B60R 21/207 |
| | | | 280/730.2 |
| 9,845,032 B1 | 12/2017 | Line et al. | |
| 10,011,205 B2 | 7/2018 | Line et al. | |
| 10,081,282 B2 | 9/2018 | Line et al. | |
| 10,166,895 B2 | 1/2019 | Line et al. | |
| 10,220,745 B2 | 3/2019 | Line et al. | |
| 10,220,750 B2 | 3/2019 | Line et al. | |
| 10,737,600 B1 | 8/2020 | Line et al. | |
| 10,933,784 B2 * | 3/2021 | Yilma | B60N 2/6009 |

(Continued)

FOREIGN PATENT DOCUMENTS

DE  102022109341 A1 * 10/2023
EP  3696014  8/2020

*Primary Examiner* — Timothy J Brindley

(57) ABSTRACT

A motor vehicle seating assembly includes a conventional common seat back frame, a plurality of forward soft trim carrier assemblies each having a unique configuration, a plurality of corresponding seat back panel and closeout assemblies, and an adapter carrier coupled with the common seat back frame and disposed between the forward soft trim carrier assembly and the corresponding seat back panel and closeout assembly. The adapter carrier includes a composite upper portion and a pair of depending frame attachment brackets coupled with a lower inboard and outboard lateral side of the composite upper portion of the adapter carrier. The pair of depending frame attachment brackets are coupled with a pair of opposed lateral side rails of the common seat back frame. The adapter carrier has a unique configuration corresponding with one of the plurality of forward soft trim carrier assemblies and the seat back panel and closeout assemblies.

18 Claims, 7 Drawing Sheets

(56) References Cited

U.S. PATENT DOCUMENTS

| | | | |
|---|---|---|---|
| 10,967,772 B2 | 4/2021 | Roman | |
| 2010/0171346 A1* | 7/2010 | Laframboise | B29C 66/742 |
| | | | 297/284.6 |
| 2016/0229322 A1* | 8/2016 | Line | B60N 2/80 |
| 2017/0349131 A1* | 12/2017 | Line | B60N 2/686 |
| 2017/0368971 A1* | 12/2017 | Matsushima | B60N 2/646 |
| 2021/0101511 A1* | 4/2021 | Berry | B60N 2/682 |
| 2022/0153221 A1* | 5/2022 | Bhagatkar | B60R 21/23138 |
| 2022/0176856 A1* | 6/2022 | Mauffrey | B60N 2/5621 |
| 2022/0227266 A1* | 7/2022 | Ofner | B60N 2/682 |
| 2023/0150411 A1* | 5/2023 | Maeda | B60N 2/90 |
| | | | 297/452.18 |
| 2023/0311731 A1* | 10/2023 | Racca | B60N 2/242 |
| | | | 297/216.13 |

\* cited by examiner

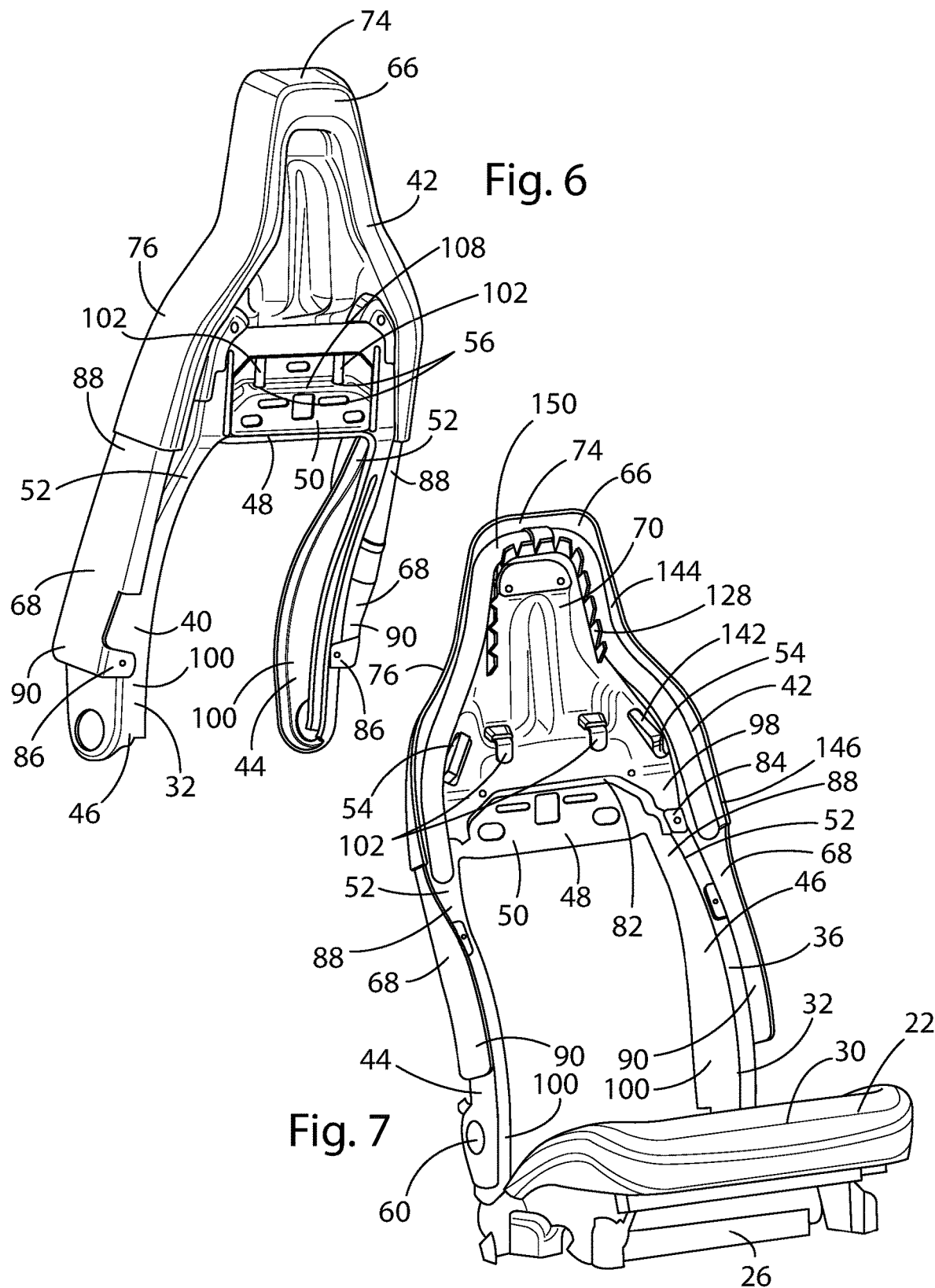

FLEXIBLE UPPER FRAME ADAPTER FOR TRADITIONAL BACK FRAME AND SEAT BACK ASSEMBLIES

FIELD OF THE INVENTION

The present disclosure generally relates to an adapter carrier for an upwardly extending seat back of a seating assembly for a motor vehicle and, more particularly, to an adapter carrier that permits the use of interchangeable forward soft trim carrier assemblies and corresponding seat back panel and closeout assemblies adapted for attachment to a common seat back frame, respectively, to provide a variety of unique seat back assembly configurations.

BACKGROUND OF THE INVENTION

Modern motor vehicle seating assemblies must provide comfort, function, and versatility in meeting the needs of customers. While manufacturers endeavor to provide customers with these attributes, as well as more and newer features, such efforts often inflict additional costs and complexity. Motor vehicle seating assemblies that provide an adaptable solution that works with traditional high volume and common seat back frames to enable differentiation and feature delivery enablement, while also providing a solution to achieve the maximum number of features and re-use of such traditional high volume and common seat back frames to achieve good value for the customer and to the enterprise, was desired.

SUMMARY OF THE INVENTION

According to one aspect of the present disclosure, a motor vehicle seating assembly for a motor vehicle includes a lower seat assembly and an upwardly extending seat back assembly. The upwardly extending seat back assembly includes a common seat back frame, a one of a plurality of forward soft trim carrier assemblies adapted for attachment to a forward portion of the common seat back frame, each of the plurality of forward soft trim carrier assemblies having a unique configuration, a one of a plurality of seat back panel and closeout assemblies attached to a rearward portion of the common seat back frame, each of the plurality of seat back panel and closeout assemblies having a unique configuration adapted to correspond with the one of the plurality of forward soft trim carriers, and an adapter carrier operably coupled with the common seat back frame and disposed between the one of the plurality of forward soft trim carrier assemblies and the corresponding one of the seat back panel and closeout assemblies. The adapter carrier further includes a composite upper portion and a pair of opposed and depending frame attachment brackets coupled with a lower inboard lateral side and a lower outboard lateral side of the composite upper portion of the adapter carrier. The pair of opposed and depending frame attachment brackets extend downwardly and are coupled with a pair of opposed lateral side rails of the common seat back frame. The adapter carrier has a unique configuration adapted to correspond with the one of the plurality of forward soft trim carrier assemblies and the corresponding one of the seat back panel and closeout assemblies.

Additional features of this aspect of the motor vehicle seating assembly include:

the composite upper portion of the adapter carrier is coupled with an upper portion of the common seat back frame, the upper portion of the common seat back frame comprises a pair of head restraint guide sleeve receivers and the composite upper portion of the adapter carrier comprises a pair of sleeve openings that align with the pair of head restraint guide sleeve receivers, and a one of a pair of head restraint guide sleeves are received within a one of each of the pair of head restraint guide sleeve receivers and extends through a one of the pair of sleeve openings in the composite upper portion of the adapter carrier;

the common seat back frame further comprises an upper cross member extending between an upper portion of the pair of opposed lateral side rails of the common seat back frame, each of the pair of head restraint guide sleeve receivers comprises an opening in an upper surface of the upper cross member and a vertically aligned receptacle on a lower horizontal surface of the upper cross member that each receives one of the pair of head restraint guide sleeves, and the composite upper portion of the adapter carrier comprises a stepped portion having a lower forward vertical surface, an upper rearward vertical surface, and an intermediate surface extending between the lower forward vertical surface and the upper rearward vertical surface upon which the pair of sleeve openings in the composite upper portion of the adapter carrier is at least partially disposed, wherein the lower forward vertical surface of the stepped portion is disposed forward of the pair of head restraint guide sleeve receivers and the intermediate surface of the stepped portion is disposed proximate the upper surface of the upper cross member;

the plurality of forward soft trim carrier assemblies each comprise a decorative outer finish trim assembly that forms a forward portion of the upwardly extending seat back assembly and defines an outer perimeter of the plurality of forward soft trim carrier assemblies;

the plurality of corresponding seat back panel and closeout assemblies comprises a decorative outer integral polymer shell that forms a rearward portion of the upwardly extending seat back assembly, has an outer perimeter that corresponds with the outer perimeter of the plurality of forward soft trim carrier assemblies, and cooperates with the one of the plurality of forward soft trim carrier assemblies to substantially enclose the upwardly extending seat back assembly;

at least one of the plurality of forward soft trim carrier assemblies and the corresponding one of the seat back panel and closeout assemblies comprise an integrated head restraint;

at least one of the plurality of forward soft trim carrier assemblies and the corresponding one of the seat back panel and closeout assemblies comprise a seat belt pass through;

an upper portion of the common seat back frame comprises a pair of forwardly extending reinforcement corner brackets and the composite upper portion of the adapter carrier comprises a pair of reinforcement corner bracket openings, wherein a one of the pair of forward extending reinforcement corner brackets are received within and extend through a one of the pair of reinforcement corner bracket openings in the composite upper portion of the adapter carrier;

a one of the pair of forward extending reinforcement corner brackets further comprises a seat belt brace disposed proximate the seat belt pass through;

the composite upper portion of the adapter carrier comprises a peripheral channel defined by an upper outer periphery of the composite upper portion of the adapter carrier and an inner flange;

the composite upper portion of the adapter carrier comprises a stepped portion having a lower forward vertical surface, and the peripheral channel is further defined by a lateral outer periphery of the composite upper portion of the adapter carrier and a lateral recess formed on either side of the lower vertical forward surface of the composite upper portion of the adapter carrier;

an airbag assembly is disposed in the peripheral channel;

a side airbag inflator canister is attached to a lower portion of a one of the pair of opposed and depending frame attachment brackets of the adapter carrier;

the peripheral channel provides an venting passage for heated or cooled air; and the peripheral channel provides an electrical conduit.

According to another aspect of the present disclosure, a motor vehicle seating assembly for a motor vehicle includes a lower seat assembly and an upwardly extending seat back assembly. The upwardly extending seat back assembly includes a common seat back frame, a forward soft trim carrier assembly adapted for attachment to a forward portion of the common seat back frame, a seat back panel and closeout assembly attached to a rearward portion of the common seat back frame, and an adapter carrier operably coupled with the common seat back frame and disposed between the forward soft trim carrier assembly and the seat back panel and closeout assembly. The adapter carrier further comprises a composite upper portion coupled with an upper portion of the common seat back frame, and a first depending frame attachment bracket coupled with a lower inboard lateral side of the composite upper portion of the adapter carrier and a second depending frame attachment bracket coupled with a lower outboard lateral side of the composite upper portion of the adapter carrier. The first and second depending frame attachment brackets extend downwardly and are coupled with a pair of opposed lateral side rails of the common seat back frame.

Additional features of this aspect of the motor vehicle seating assembly include:

an upper portion of the common seat back frame comprises a pair of forward extending reinforcement corner brackets and the composite upper portion of the adapter carrier comprises a pair of reinforcement corner bracket openings, wherein a one of the pair of forward extending reinforcement corner brackets are received within and extend through a one of the pair of reinforcement corner bracket openings in the composite upper portion of the adapter carrier, and the composite upper portion of the adapter carrier comprises an inner flange and a stepped portion having a lower forward vertical surface, and a peripheral channel defined by an upper outer periphery of the adapter carrier and the inner flange and by an outer periphery of the composite upper portion of the adapter carrier and a recess formed on either side of the lower forward vertical surface of the composite upper portion of the adapter carrier; and an airbag assembly is disposed in the peripheral channel in juxtaposed relation with the pair of forward extending reinforcement corner brackets that each include an airbag reaction surface.

According to yet another aspect of the present disclosure, a motor vehicle seating assembly includes a lower seat assembly and an upwardly extending seat back assembly. The upwardly extending seat back assembly includes a common seat back frame comprising an upper cross member extending between an inboard lateral side rail of the common seat back frame and an outboard lateral side rail of the common seat back frame, a forward soft trim carrier assembly adapted for attachment to a forward portion of the common seat back frame, a seat back panel and closeout assembly attached to a rearward portion of the common seat back frame, and an adapter carrier operably coupled with the common seat back frame and disposed between the forward soft trim carrier assembly and the seat back panel and closeout assembly. The adapter carrier further comprises a composite upper portion coupled with the upper cross member of the common seat back frame, and a first downwardly depending frame attachment bracket coupled with a lower inboard lateral side of the composite upper portion of the adapter carrier at first end and a lower portion of the inboard lateral side rail of the common seat back frame at a second end and a second downwardly depending frame attachment bracket coupled with a lower outboard lateral side of the composite upper portion of the adapter carrier at first end and a lower portion of the outboard lateral side rail of the common seat back frame at a second end.

Additional features of this aspect of the motor vehicle seating assembly include:

the upper cross member comprises a pair of head restraint guide sleeve receivers and the composite upper portion of the adapter carrier comprises a pair of sleeve openings that align with the pair of head restraint guide sleeve receivers, and a one of a pair of head restraint guide sleeves are received within a one of each of the pair of head restraint guide sleeve receivers and extends through a one of the pair of sleeve openings in the composite upper portion of the adapter carrier, whereby the composite upper portion of the adapter carrier is coupled with an upper cross member.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 6 is a rear perspective view of the assembled common seat back frame and adapter carrier of the motor vehicle seating assembly of FIG. 1 according to the present disclosure;

FIG. 7 is a front perspective view of the assembled common seat back frame and adapter carrier of the motor vehicle seating assembly of FIG. 1 according to the present disclosure, providing a mounting location of a side airbag assembly;

DETAILED DESCRIPTION OF THE EMBODIMENTS

Figure 1:
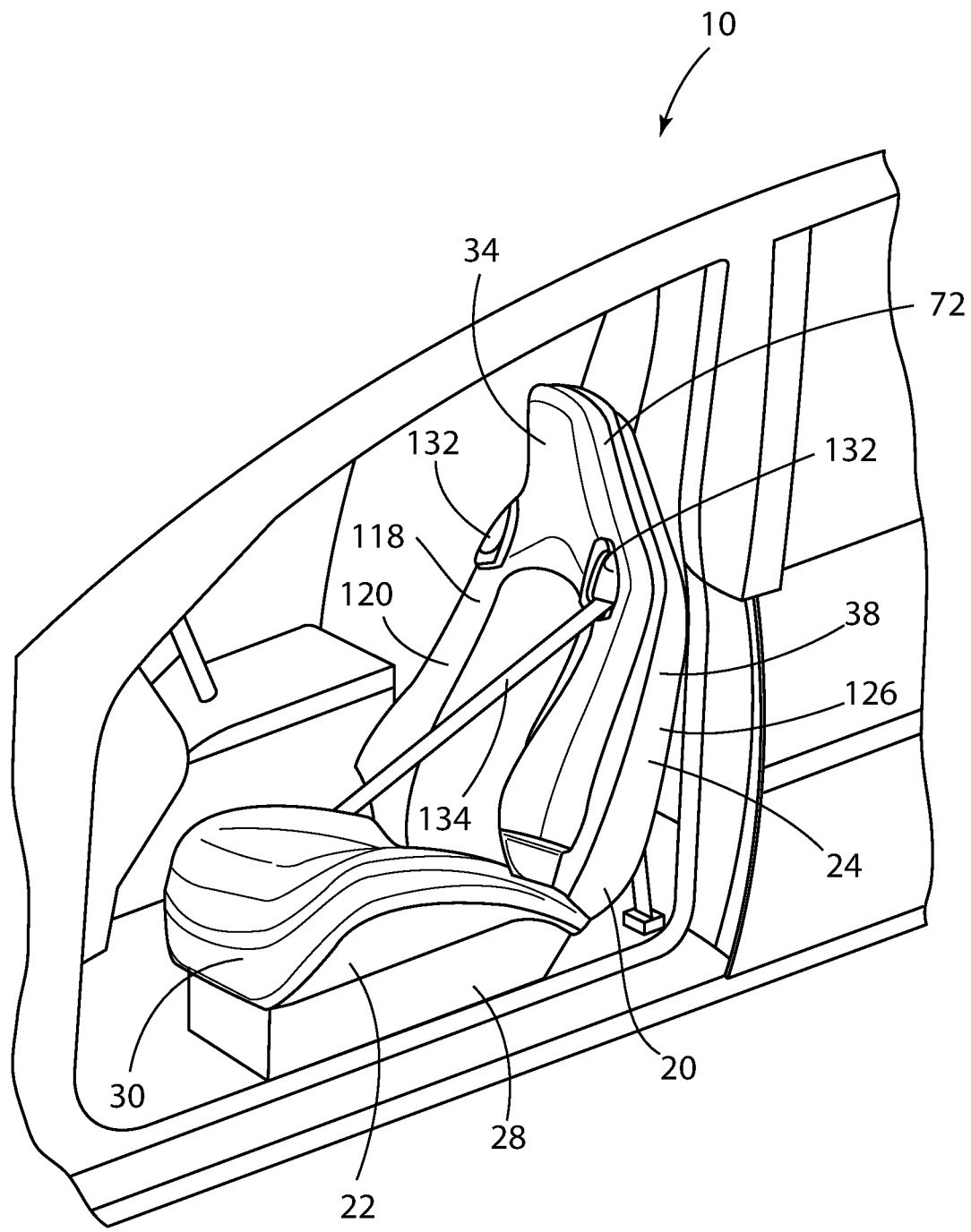
FIG. 1 is a partial front side perspective view of motor vehicle provided with the motor vehicle seating assembly of the present disclosure.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 2:
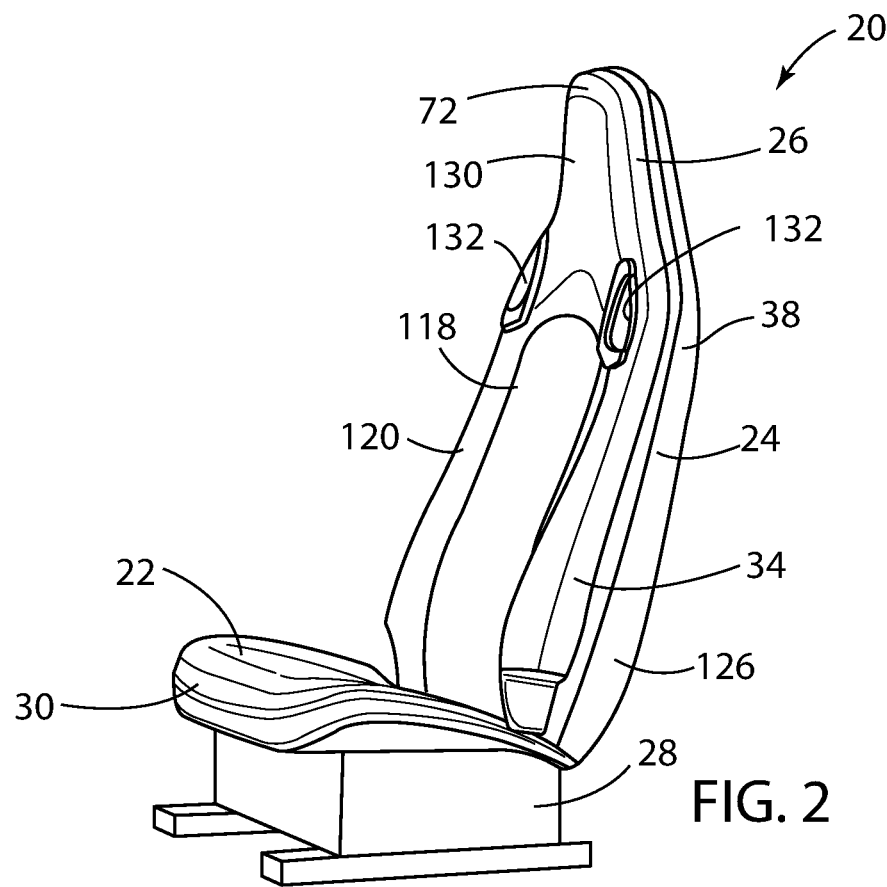
FIG. 2 is a front side perspective view of the motor vehicle seating assembly of FIG. 1 according to the present disclosure.

Referring to FIGS. 1 and 2, a motor vehicle 10 is shown equipped with one of a plurality of motor vehicle seating assemblies 20 having a lower seat assembly 22 and an upwardly extending seat back assembly 24. The upwardly extending seat back assembly 24 may incorporate an integral head restraint 26 thereon. The upwardly extending seat back assembly 24 may be pivotally coupled with the lower seat assembly 22, such that the upwardly extending seat back assembly 24 can be moved between upright and inclined positions relative the lower seat assembly 22.

Referring to FIGS. 2 and 3A-3C, the lower seat assembly 22 includes a lower seat frame base 28 to which a lower seat cushion and suspension module 30 is attached. The upwardly extending seat back assembly 24 includes a common seat back frame 32. The term "common seat back frame" used herein refers to a seat back frame 32 having structural features that are configured for use within motor vehicle seating assemblies 20 having a plurality of different configurations, rather than for dedicated use in a single motor vehicle seating assembly 20 configuration. The upwardly extending seat back assembly 24 also includes one of a plurality of forward soft trim carrier assemblies 34 adapted for attachment to a forward portion 36 of the common seat back frame 32, one of a plurality of seat back panel and closeout assemblies 38 attached to a rearward portion 40 of the common seat back frame 32, and an adapter carrier 42 operably coupled with the common seat back frame 32 and disposed between the one of the plurality of forward soft trim carrier assemblies 34 and a corresponding one of the seat back panel and closeout assemblies 38.

Figure 3A:
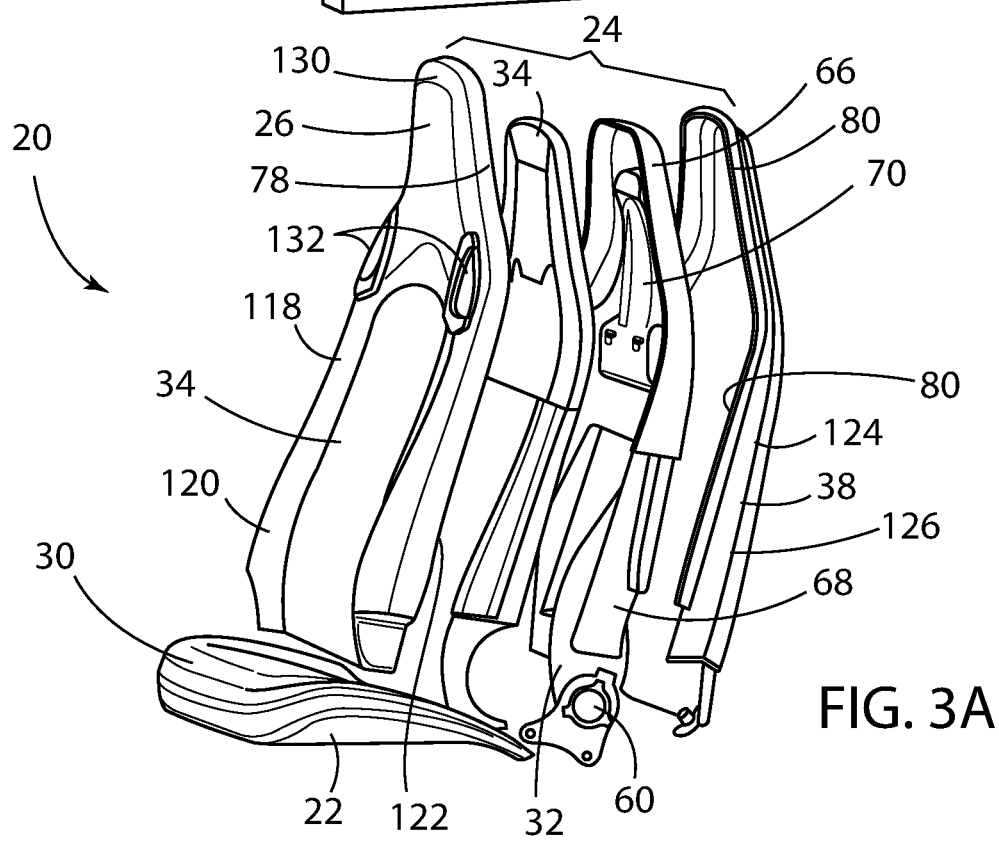
FIG. 3A is an exploded front side perspective view of a first configuration of the motor vehicle seating assembly of FIG. 1 according to the present disclosure.
Figure 3B:
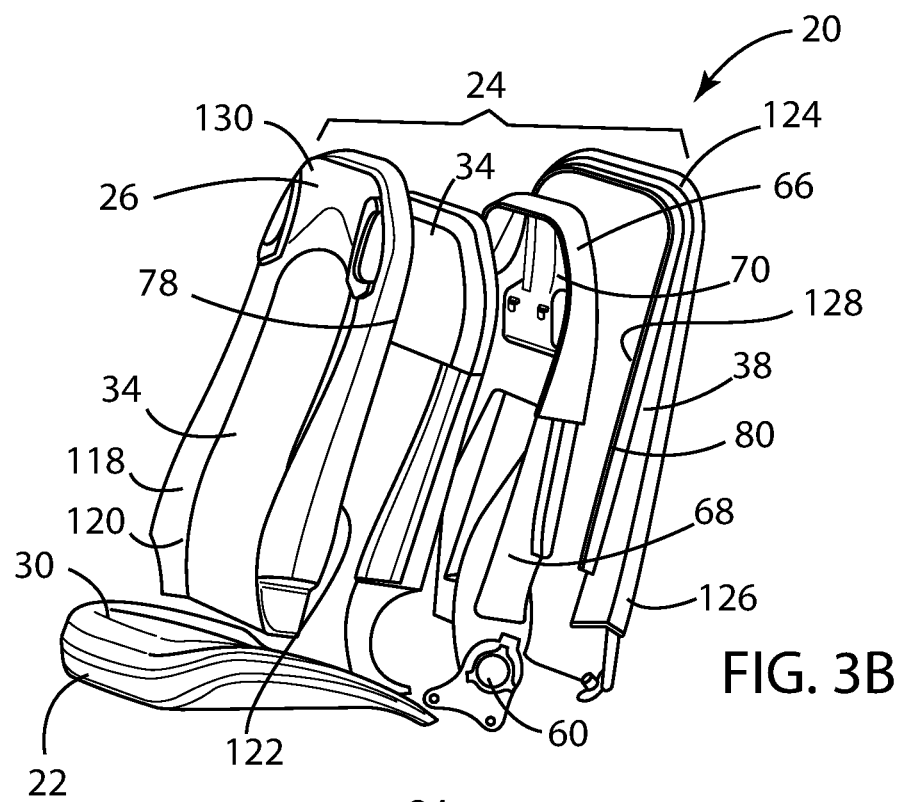
FIG. 3B is an exploded front side perspective view of a second configuration of the motor vehicle seating assembly of FIG. 1 according to the present disclosure.
Figure 3C:
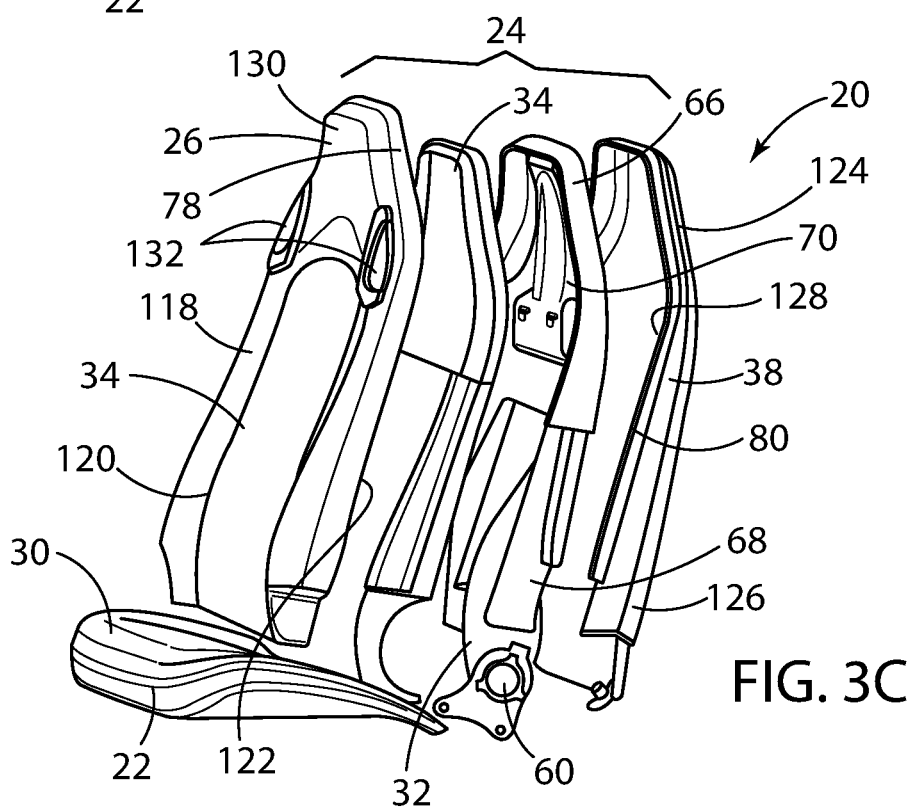
FIG. 3C is an exploded front side perspective view of a third configuration of the motor vehicle seating assembly of FIG. 1 according to the present disclosure.

As perhaps best shown in FIGS. 3A-3C, each of the motor vehicle seating assemblies 20 may have a unique configuration, with each sharing a traditional high volume and low cost common seat back frame 32. That is, the common seat back frame 32 is common to each of the configurations of the motor vehicle seating assemblies 20 shown in FIGS. 3A-3C. By the use of the traditional high volume and low cost common seat back frames 32, overall costs for the motor vehicle seating assembly 20 may be reduced. In order to provide the desired differentiation and feature delivery enablement, each of the motor vehicle seating assemblies 20 shown include one of the plurality of forward soft trim carrier assemblies 34, each having a unique configuration. Similarly, each of the motor vehicle seating assemblies 20 shown include one of the plurality of seat back panel and closeout assemblies 38 also having a unique configuration adapted to correspond with the one of the plurality of forward soft trim carrier assemblies 34.

The common seat back frame 32 includes an inboard lateral side rail 44 and an outboard lateral side rail 46. An upper portion 48 of the common seat back frame 32 may include an upper cross member 50 extending between an upper portion 52 of the pair of opposed inboard lateral side rail 44 and outboard lateral side rail 46 of the common seat back frame 32. The upper portion 48 of the common seat back frame 32 may include a pair of forwardly extending reinforcement corner brackets 54. The upper cross member 50 may also include a pair of head restraint guide sleeve receivers 56. A lower cross member 58 may also be provided. An optional pivot assembly 60 rotationally couples the common seat back frame 32 and the upwardly extending seat back assembly 24 to the lower seat base frame 28. The common seat back frame 32 thus forms the basic structure for the upwardly extending seat back assembly 24 and defines a forward portion 36 and a rearward portion 40.

The adapter carrier 42 is coupled with the common seat back frame 32. The adapter carrier 42 itself may have a unique configuration adapted to correspond with the one of the plurality of forward soft trim carrier assemblies 34 and the corresponding one of the seat back panel and closeout assemblies 38. The adapter carrier 42 may include a composite upper portion 66 and a pair of opposed and depending frame attachment brackets 68 coupled with a lower inboard lateral side and a lower outboard lateral side of the composite upper portion 66 of the adapter carrier 42.

Figure 4:
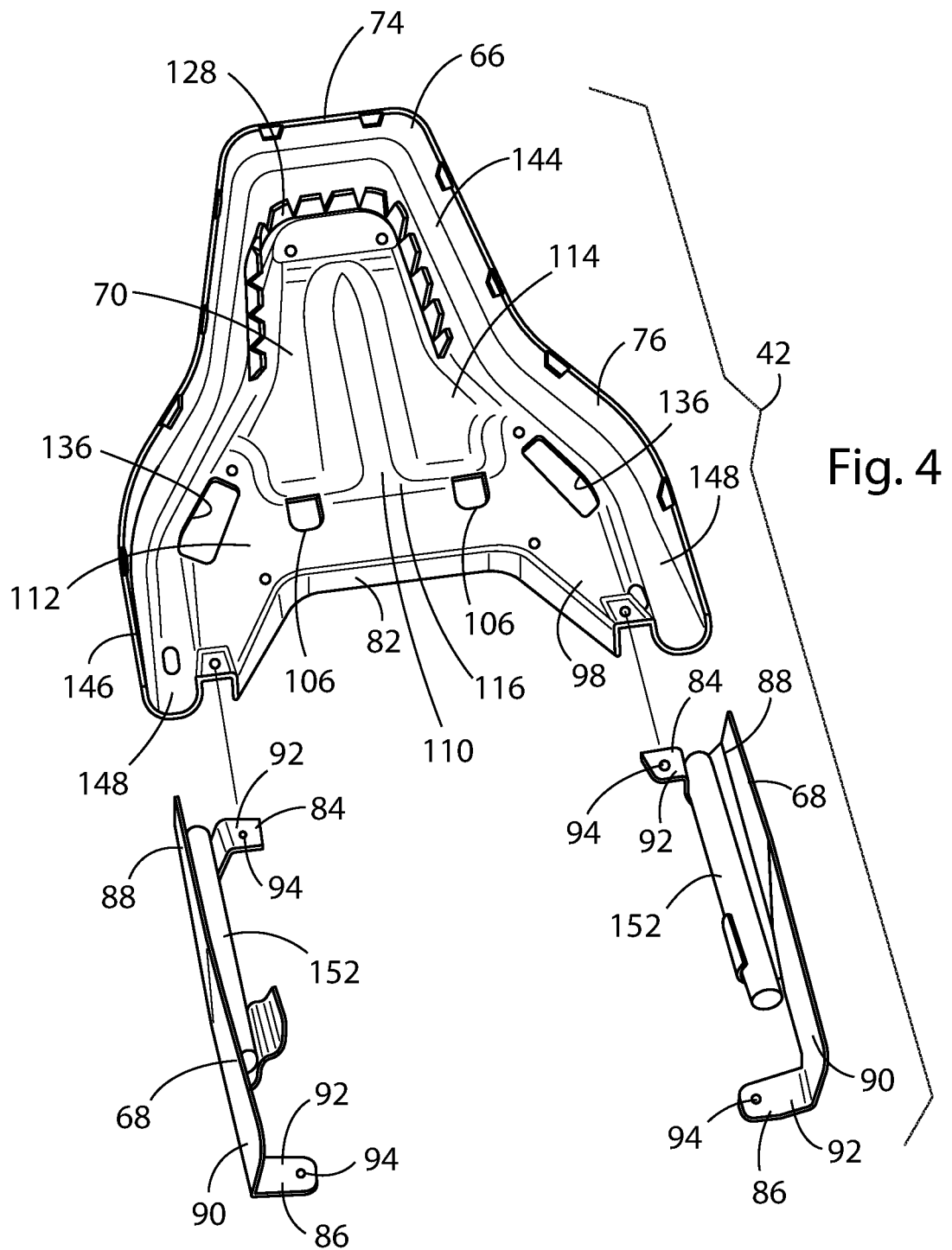
FIG. 4 is a front perspective view of the adapter carrier of the motor vehicle seating assembly of FIG. 1 according to the present disclosure.

As shown in FIG. 4, the composite upper portion 66 of the adapter carrier 42 may be fabricated as an injected molded component from an injectable composite material, such as fiber-reinforced polymer. The composite upper portion 66 may have a substantially planar structure having a recessed central portion 70 that defines an upper portion 72 of the upwardly extending seat back assembly 24 of the motor vehicle seating assembly 20. An upper outer periphery 74 of the adapter carrier 42 is may include a forwardly extending lip 76 and is designed to match an upper outer periphery 78 of one of the forward soft trim carrier assemblies 34 and an upper outer periphery 80 of one of the plurality of seat back panel and closeout assemblies 38. A lower periphery 82 of the composite upper portion 66 of the adapter carrier 42 is designed to interface with the upper cross member 50 of the common seat back frame 32, as further described below.

Figure 5:
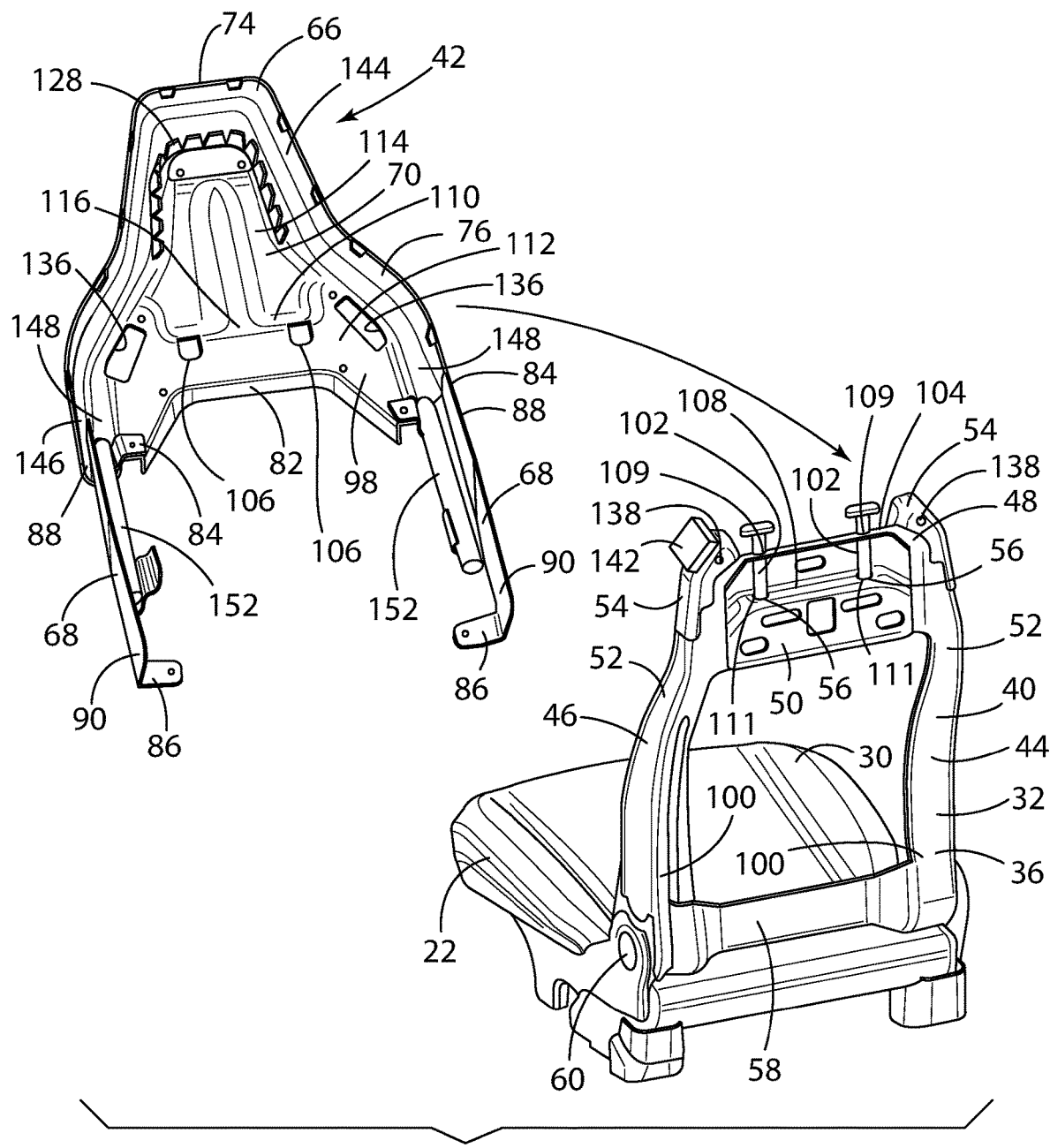
FIG. 5 is a rear perspective view of the common seat back frame and a front perspective view of the adapter carrier of the motor vehicle seating assembly of FIG. 1 according to the present disclosure.

Each of the pair of opposed and depending frame attachment brackets 68 coupled with the composite upper portion 66 of the adapter carrier 42 may be fabricated from a stiff material, such as cold rolled high carbon steel, to define a robust vertically structure. The pair of opposed and depending frame attachment brackets 68 may have an L-shaped linear shape, or, as shown in FIG. 4, may include a pair of orthogonally projecting ears 84, 86, one at an upper proximal end 88 and another at a lower distal end 90, respectively. The upper proximal end 88 of the pair of opposed and depending frame attachment brackets 68 may each be attached proximate the lower periphery 82 of the composite upper portion 66 of the adapter carrier 42, as shown in FIG. 5, while the lower distal end 90 of the pair of opposed and depending frame attachment brackets 68 may each be attached to the lateral side rails 44, 46 of the common rear seat frame 32, as shown in FIGS. 6 and 7.

Each of the projecting ears 84, 86 may be provided with a planar surface 92 having an opening 94 through which a fastener (not shown) may be passed to couple the pair of opposed and depending frame attachment brackets 68 to the lower periphery 82 of the composite upper portion 66 of the adapter carrier 42 and the lateral side rails 44, 46 of the common seat back frame 32. The projecting ear 84 at the upper proximal end 88 and the projecting ear 86 at the lower distal end 90 may be offset, as shown in FIG. 4, such that the planar surface 92 of the projecting ears 84, 86 are disposed in parallel displaced planes. As such, the projecting ears 84 at the upper proximal end 88 may be attached to a front surface 98 of the composite upper portion 66 of the adapter carrier 42 and the projecting ears 86 at the lower distal end 90 may be attached to the rearward portion 40 of the lateral side rails 44, 46 of the common rear seat frame 32, whereby a rearward torsional load on the upper portion 72 of the upwardly extending seat back assembly 24 may be resisted.

Thus, to couple the adapter carrier 42 to the common seat back frame 32, the pair of opposed and depending frame attachment brackets 68 extend downwardly and are coupled with the pair of opposed lateral side rails 44, 46 of the common seat back frame 32. That is, a first downwardly depending frame attachment bracket 68 may be coupled with a lower inboard lateral side of the composite upper portion 66 of the adapter carrier 42 at the first upper proximal end 88 and a lower portion 100 of the inboard lateral side rail 44 of the common seat back frame 32 at the second lower distal end 90 and a second downwardly depending frame attachment bracket 68 may be coupled with a lower outboard lateral side of the composite upper portion 66 of the adapter carrier 42 at the first upper proximate end 88 and the lower portion 100 of the outboard lateral side rail 46 of the common seat back frame 32 at the second lower distal end 90.

As further shown in FIGS. 6 and 7, in addition to the attachment of the adapter carrier 42 to the common seat back frame 32 via the pair of opposed and depending frame attachment brackets 68, as described above, the adapter carrier 42 may be coupled with the upper portion 48 of the common seat back frame 32. That is, a further innovation of the present disclosure is the manner in which the adapter carrier 42 may be further coupled with the common seat back frame 32.

In traditional common seat back frames 32, head restraint guide sleeves 102 are employed to mount traditional head restraints (not shown). The head restraint guide sleeves 102 are pushed through head restraint guide sleeve receivers 56 disposed through an upper surface 104 of the upper cross member 50 of the common seat back frame 32, respectively, during final seat assembly until fully seated and locked in place. Once installed, the head restraint guide sleeves 102 form guide sleeve tubes or cavities within which the head restraint mounting posts of the head restraint (not shown) can be inserted and vertically adjusted. One of the innovations of the present disclosure utilizes these features of traditional common seat back frames 32 and contributes to the modular design disclosed herein, and provides an assembly concept that offers reduced costs and improved design flexibility.

As shown in FIGS. 3A-3C, the traditional head restraint may be omitted. However, the common seat back frame 32 is the main structural member of each of the plurality of upwardly extending seat back assemblies 24 and may primarily include the pair of vertically extending lateral side rails 44, 46, and the upper cross member 50 forming an upper portion 48 thereof, where the upper cross member 50 of the common seat back frame 32 may be provided with the pair of vertically oriented head restraint guide sleeve receivers 56 within the upper cross member forming the upper portion 48 thereof. The composite upper portion 66 of the adapter carrier 42 may further include a pair of sleeve openings 106 that align with the pair of head restraint guide sleeve receivers 56, perhaps best shown in FIG. 5. The sleeve openings 106 and head restraint guide sleeve receivers 56 are disposed in vertical alignment, one with the other.

After assembly of the composite upper portion 66 to the common seat back frame 32 via the downwardly depending frame attachment brackets 68 described above, the pair of head restraint guide sleeves 102 may be vertically received and retained within the sleeve openings 106 and the head restraint guide sleeve receivers 56. Each of the pair of head restraint guide sleeve receivers 56 may include an opening 109 in the surface 104 of the upper cross member 50 of the common seat back frame 32 and a vertically aligned receptacle 111 on a lower horizontal surface 108 of the upper cross member 50 that each receives and secures one of the pair of head restraint guide sleeves 102.

As further described below, the head restraint guide sleeves 102 are received and retained within the sleeve openings 106 of the composite upper portion 66 of the adapter carrier 42 and the head restraint guide sleeve receivers 56 of the upper cross member 50 of the common seat back frame 32, respectively, to mechanically lock the composite upper portion 66 of the adapter carrier 42 to the common seat back frame 32. To this end, as shown in FIG. 6, one of a pair of head restraint guide sleeves 102 are received within each of the pair of head restraint guide sleeve receivers 56 and extends through one of the pair of sleeve openings 106 in the composite upper portion 66 of the adapter carrier 42.

The recessed central portion 70 of the composite upper portion 66 of the adapter carrier 42 may also include a stepped portion 110 having a lower forward vertical surface 112, an upper rearward vertical surface 114, and an intermediate surface 116 extending between the lower forward vertical surface 112 and the upper rearward vertical surface 114 upon which each of the pair of sleeve openings 106 in the composite upper portion 66 of the adapter carrier 42 is at least partially disposed. The lower forward vertical surface 112 of the stepped portion 110 may be disposed forward of the pair of head restraint guide sleeve receivers 56 and the head restraint guide sleeves 102 and the intermediate surface 116 of the stepped portion 110 may be disposed proximate and in juxtaposed relation to the upper surface 104 of the upper cross member 50.

The pair of head restraint guide sleeves 102, when pushed through the sleeve openings 106 in the composite upper portion 66 of the adapter carrier 42 and then through the upper cross member 50 of the common seat back frame 32 act as "mechanical locks" for the adapter carrier 42 to the common seat back frame 32. The benefit of the "locks" helps impede the composite upper portion 66 of the adapter carrier 42 from listing forward during dynamic events and remain "locked" to the common seat back frame 32.

The plurality of forward soft trim carrier assemblies 34 each comprise a decorative outer finish trim assembly 118 that forms a forward portion 120 of the upwardly extending seat back assembly 24 to define the outer perimeter 78. The plurality of corresponding seat back panel and closeout assemblies 38 each comprise a decorative outer integral polymer shell 124 that forms a rearward portion 126 of the upwardly extending seat back assembly 24. The plurality of corresponding seat back panel and closeout assemblies each have the upper outer perimeter 80 that corresponds with the upper outer perimeter 78 of the forward soft trim carrier assemblies 34, and cooperate with a corresponding one of the plurality of forward soft trim carrier assemblies 34 to substantially enclose the upwardly extending seat back assembly 24.

Thus, a plurality of upwardly extending seat back assemblies 24 may be provided, each with a unique and desired configuration. For example, the one of plurality of forward soft trim carrier assemblies 34 and the corresponding one of the plurality of seat back panel and closeout assemblies 38 may be used to define an modifiable integrated head restraint 130. As shown in FIG. 3A, the upwardly extending seat back assembly 24 may have relatively tall integrated head restraint 130. As shown in FIG. 3B, the integrated head restraint 130 may be significant shorter. As shown in FIG. 3C, the integrated head restraint 130 may assume an intermediate height. Overall, however, the configuration of each of the plurality of upwardly extending seat back assemblies 24 shown in FIGS. 3A-3C present a different and unique configuration that may be adapted for different model lines and/or trim levels.

The integral polymer shell 124 of the plurality of seat back panel and closeout assemblies 38 may be injection molded from a semi-rigid plastic material. As a decorative component, the exposed rear exterior surface area seat back panel and closeout assemblies 38 represents an A-surface within the interior of the motor vehicle 10 and may be finished with a high grade, textured, grained surface to simulate leather or another predetermined surface finish. The seat back panel and closeout assembly 38 may include a map pocket (not shown) and, additionally or alternatively, mountings for beverage holders and closable compartments (not shown) might be incorporated within the seat back panel and closeout assemblies 38, which then may be merely attached to the seat back panel and closeout assemblies 38 for subsequent assembly into the motor vehicle seating assembly 20 for a particular vehicle build, without having to adopt the same seat back panel and closeout assembly 38 for every configuration of the motor vehicle seating assembly 20 installed in a particular motor vehicle 10 line.

In addition, the one of the plurality of forward soft trim carrier assemblies 34 and the corresponding one of the seat back panel and closeout assemblies 38 may include a seat belt pass through 132, through which a seat belt assembly 134 may be deployed, as shown in FIG. 1. As noted above, the upper portion 48 of the common seat back frame 32 may include the pair of forwardly extending reinforcement corner brackets 54 and the recessed central portion 70 of the composite upper portion 66 of the adapter carrier 42 may include a pair of reinforcement corner bracket openings 136, wherein one of the pair of reinforcement corner brackets 54 are received within and extend through one of the pair of reinforcement corner bracket openings 136 in the composite upper portion 66 of the adapter carrier 42. In addition, each of the pair of forward extending reinforcement corner brackets 54 may be provided with an opening 138 through which a fastener (not shown) may be passed to couple the pair of forward extending reinforcement corner brackets 54 on the common seat back frame 32 to the recessed central portion 70 of the composite upper portion 66 of the adapter carrier 42. Further, one of the pair of forward extending reinforcement corner brackets 54 may also include a seat belt brace 142 disposed proximate the seat belt pass through 132 to provide structural support for the operation of the seat belt assembly 124, as shown in FIG. 5.

An additional advantage of the present disclosure is the ability to integrate functional features into the upwardly extending seat back assembly 24. For example, as shown in FIG. 4, the composite upper portion 66 of the adapter carrier 42 may include a peripheral channel 144 within the recessed central portion 70 defined by an upper outer periphery 74 of the adapter carrier 42 and an inner flange 128. The composite upper portion 66 of the adapter carrier 42 may also include the stepped portion 110 having the lower forward vertical surface 112, and the peripheral channel 144 may be further defined by a lateral outer periphery 146 of the composite upper portion 66 of the adapter carrier 42 and a lateral recess 148 formed on either side of the lower forward vertical surface 112 of the composite upper portion 66 of the adapter carrier 42.

As shown in FIG. 7, a side airbag assembly 150 may be disposed in the peripheral channel 144 of the composite upper portion 66 of the adapter carrier 42. Further, a side airbag inflator canister 152 may be attached to the lower distal end 90 of one or both of the pair of opposed and depending frame attachment brackets 68 of the adapter carrier 42. The side airbag assembly 150 may be mounted within the adapter carrier 42 proximate one or both of the pair of forward extending reinforcement corner brackets 54, as shown in FIG. 7, to provide an integrated airbag reaction surface(s).

Figure 8:
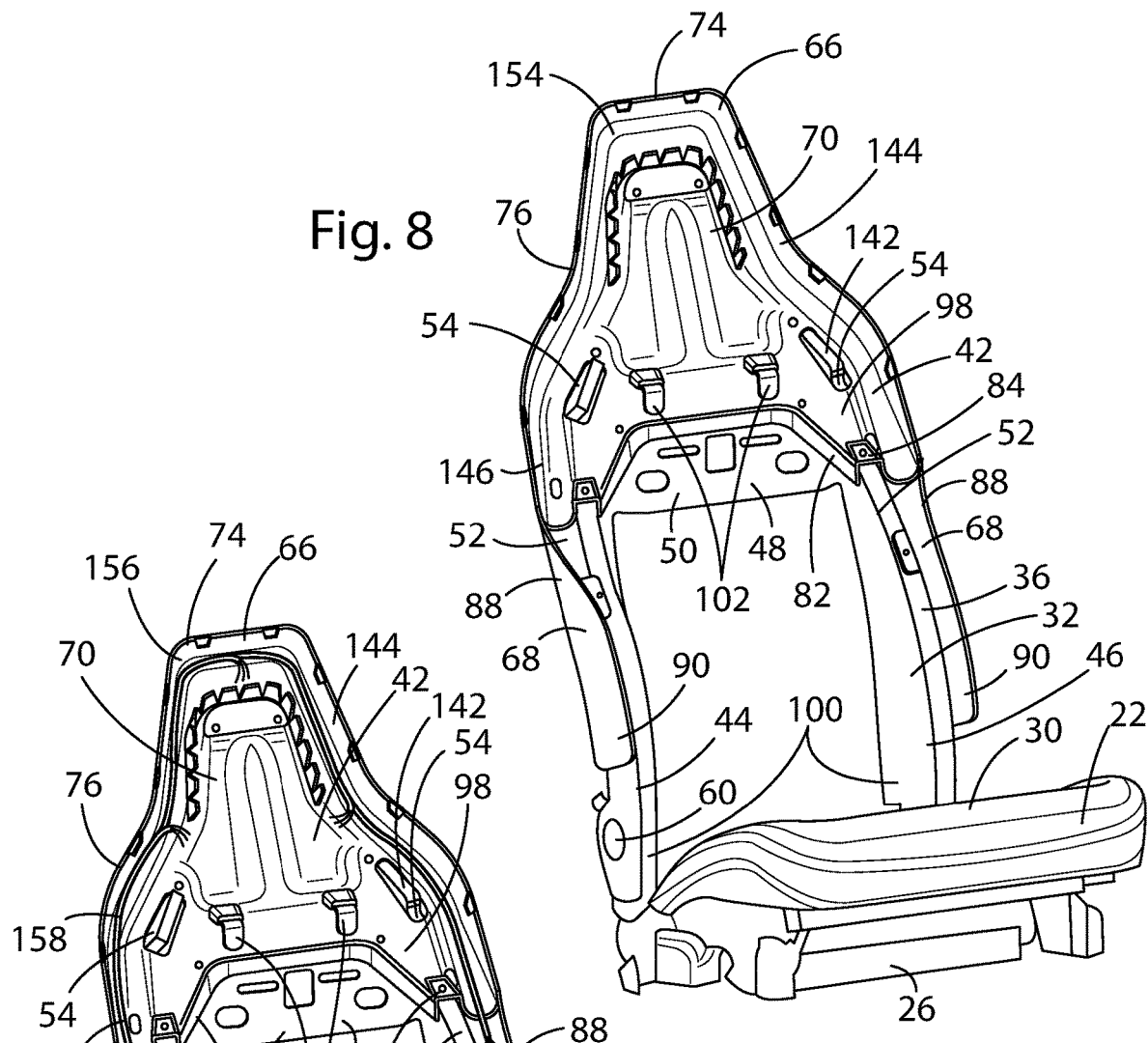
FIG. 8 is a front perspective view of the assembled common seat back frame and adapter carrier of the motor vehicle seating assembly of FIG. 1 according to the present disclosure, providing ventilation passages.
Figure 9:
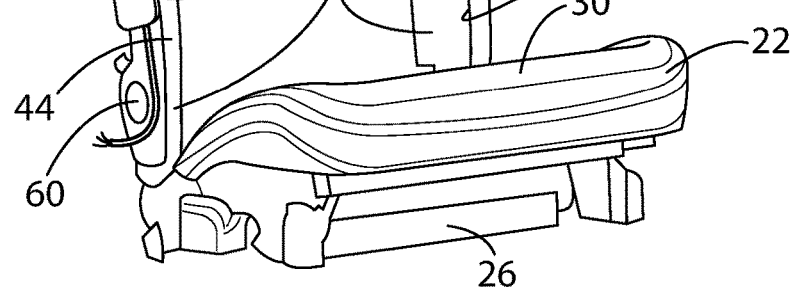
FIG. 9 is a front perspective view of the assembled common seat back frame and adapter carrier of the motor vehicle seating assembly of FIG. 1 according to the present disclosure, providing electrical conduits.

In addition or alternatively, the peripheral channel 144 of the composite upper portion 66 of the adapter carrier 42 may be employed to provide a venting passage 154 for heated or cooled air. That is, when assembled, the adapter carrier 42 cooperates with the forward soft trim carrier assemblies 34 to define an enclosed passage or plenum within which ventilation air flow may be provided from one location in the upwardly extending seat back assembly 24 to another, as shown in FIG. 8. The ventilation air flow may be heated air or cooled air. Similarly, the peripheral channel 144 be employed to provide an electrical conduit 156 within the confines of the upwardly extending seat back assembly 24 within which electrical wiring harnesses 158 can be situated, as shown in FIG. 9.

As described above, the adapter carrier 42 provides a modular seatback-mounted composite assembly that allows integrated assembly locations for numerous features, such as trim, foam, electrical wiring, integrated head restraints, heating, ventilation, and cooling air routing, and airbag packaging and deployment enablement. The adapter carrier 42 readily mounts to traditional common seat back frames 32 for ease of assembly and high re-use of in-production common seat back frame 32 technologies with simple fasteners and existing head restraint guide-sleeve assembly features. Finally, the adapter carrier 42 provides a structural addition to the common seat back frame 32 that allows assembly of the entire upwardly extending seat back assembly 24, while at the same time enabling the upwardly extending seat back assembly 24 to present advanced product styling and features at a lower cost.

As described above, the adapter carrier 42 and common seat back frame 32 of the present disclosure provides integrated modular assembly features by modularizing the upwardly extending seat back assembly 24 with the use of the common seat back frame 32. The described upright seat back assembly 24 uses the adapter carrier 42 that enables the use of the traditional common seat back frame 32 within a number of different upwardly extending seat back assembly 24 configurations to provide a crafted, easier to assemble, and more cost- and time-efficient product for the upwardly extending seat back assembly 24.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A motor vehicle seating assembly for a motor vehicle having a lower seat assembly and an upwardly extending seat back assembly, the upwardly extending seat back assembly comprising;
   a seat back frame;
   a one of a plurality of forward soft trim carrier assemblies adapted for attachment to a forward portion of the seat back frame, each of the plurality of forward soft trim carrier assemblies having a different configuration;
   a one of a plurality of seat back panel and closeout assemblies attached to a rearward portion of the seat back frame, each of the plurality of seat back panel and closeout assemblies having a different configuration adapted to correspond with the one of the plurality of forward soft trim carriers; and
   an adapter carrier operably coupled with the seat back frame and disposed between the one of the plurality of forward soft trim carrier assemblies and the corresponding one of the seat back panel and closeout assemblies, wherein the adapter carrier further comprises:
   a composite upper portion; and
   a pair of opposed and depending frame attachment brackets coupled with a lower inboard lateral side and a lower outboard lateral side of the composite upper portion of the adapter carrier;
   wherein the pair of opposed and depending frame attachment brackets extend downwardly and are coupled with a pair of opposed lateral side rails of the seat back frame; and
   wherein the adapter carrier has a different configuration adapted to correspond with the one of the plurality of forward soft trim carrier assemblies and the corresponding one of the seat back panel and closeout assemblies.

2. The motor vehicle seating assembly of claim 1, wherein:
   the composite upper portion of the adapter carrier is coupled with an upper portion of the seat back frame;
   the upper portion of the seat back frame comprises a pair of head restraint guide sleeve receivers and the composite upper portion of the adapter carrier comprises a pair of sleeve openings that align with the pair of head restraint guide sleeve receivers; and
   a one of a pair of head restraint guide sleeves are received within a one of each of the pair of head restraint guide sleeve receivers and extends through a one of the pair of sleeve openings in the composite upper portion of the adapter carrier.

3. The motor vehicle seating assembly of claim 2, wherein:
   the seat back frame further comprises an upper cross member extending between an upper portion of the pair of opposed lateral side rails of the seat back frame:
   each of the pair of head restraint guide sleeve receivers comprises an opening in an upper surface of the upper cross member and a vertically aligned receptacle on a lower horizontal surface of the upper cross member that each receives one of the pair of head restraint guide sleeves; and the composite upper portion of the adapter carrier comprises a stepped portion having a lower forward vertical surface, an upper rearward vertical surface, and an intermediate surface extending between the lower forward vertical surface and the upper rearward vertical surface upon which the pair of sleeve openings in the composite upper portion of the adapter carrier is at least partially disposed, wherein the lower forward vertical surface of the stepped portion is disposed forward of the pair of head restraint guide sleeve receivers and the intermediate surface of the stepped portion is disposed proximate the upper surface of the upper cross member.

4. The motor vehicle seating assembly of claim 1, wherein the plurality of forward soft trim carrier assemblies each comprise a decorative outer finish trim assembly that forms a forward portion of the upwardly extending seat back assembly and defines an outer perimeter of the plurality of forward soft trim carrier assemblies.

5. The motor vehicle seating assembly of claim 4, wherein the plurality of corresponding seat back panel and closeout assemblies comprises a decorative outer integral polymer shell that forms a rearward portion of the upwardly extending seat back assembly, has an outer perimeter that corresponds with the outer perimeter of the plurality of forward soft trim carrier assemblies, and cooperates with the one of the plurality of forward soft trim carrier assemblies to substantially enclose the upwardly extending seat back assembly.

6. The motor vehicle seating assembly of claim 5, wherein at least one of the plurality of forward soft trim carrier assemblies and the corresponding one of the seat back panel and closeout assemblies comprise an integrated head restraint.

7. The motor vehicle seating assembly of claim 5, wherein at least one of the plurality of forward soft trim carrier assemblies and the corresponding one of the seat back panel and closeout assemblies comprise a seat belt pass through.

8. The motor vehicle seating assembly of claim 7, wherein an upper portion of the seat back frame comprises a pair of forwardly extending reinforcement corner brackets and the composite upper portion of the adapter carrier comprises a pair of reinforcement corner bracket openings, wherein a one of the pair of forward extending reinforcement corner brackets are received within and extend through a one of the pair of reinforcement corner bracket openings in the composite upper portion of the adapter carrier.

9. The motor vehicle seating assembly of claim 8, wherein a one of the pair of forward extending reinforcement corner brackets further comprises a seat belt brace disposed proximate the seat belt pass through.

10. The motor vehicle seating assembly of claim 1, wherein the composite upper portion of the adapter carrier comprises a peripheral channel defined by an upper outer periphery of the composite upper portion of the adapter carrier and an inner flange.

11. The motor vehicle seating assembly of claim 10, wherein the composite upper portion of the adapter carrier comprises a stepped portion having a lower forward vertical surface, and the peripheral channel is further defined by a lateral outer periphery of the composite upper portion of the adapter carrier and a lateral recess formed on either side of the lower forward vertical surface of the composite upper portion of the adapter carrier.

12. The motor vehicle seating assembly of claim 10, wherein an airbag assembly is disposed in the peripheral channel.

13. The motor vehicle seating assembly of claim 12, wherein a side airbag inflator canister is attached to a lower portion of a one of the pair of opposed and depending frame attachment brackets of the adapter carrier.

14. The motor vehicle seating assembly of claim 10, wherein the peripheral channel provides a venting passage for heated or cooled air.

15. The motor vehicle seating assembly of claim 10, wherein the peripheral channel provides an electrical conduit.

16. A motor vehicle seating assembly for a motor vehicle having a lower seat assembly and an upwardly extending seat back assembly, the upwardly extending seat back assembly comprising;
 a seat back frame;
 a forward soft trim carrier assembly adapted for attachment to a forward portion of the seat back frame;
 a seat back panel and closeout assembly attached to a rearward portion of the seat back frame; and
 an adapter carrier operably coupled with the seat back frame and disposed between the forward soft trim carrier assembly and the seat back panel and closeout assembly, wherein the adapter carrier further comprises:
 a composite upper portion coupled with an upper portion of the seat back frame; and
 a first depending frame attachment bracket coupled with a lower inboard lateral side of the composite upper portion of the adapter carrier and a second depending frame attachment bracket coupled with a lower outboard lateral side of the composite upper portion of the adapter carrier;
 wherein the first and second depending frame attachment brackets extend downwardly and are coupled with a pair of opposed lateral side rails of the seat back frame;
 an upper portion of the interchangeable seat back frame comprises a pair of forward extending reinforcement corner brackets and the composite upper portion of the adapter carrier comprises a pair of reinforcement corner bracket openings, wherein a one of the pair of forward extending reinforcement corner brackets are received within and extend through a one of the pair of reinforcement corner bracket openings in the composite upper portion of the adapter carrier; and,
 wherein the composite upper portion of the adapter carrier comprises an inner flange and a stepped portion having a lower forward vertical surface, and a peripheral channel defined by an upper outer periphery of the adapter carrier and the inner flange and by an outer periphery of the composite upper portion of the adapter carrier and a recess formed on either side of the lower forward surface of the composite upper portion of the adapter carrier.

17. The motor vehicle seating assembly of claim 16, wherein an airbag assembly is disposed in the peripheral channel in juxtaposed relation with the pair of forward extending reinforcement corner brackets that each include an airbag reaction surface.

18. A motor vehicle seating assembly for a motor vehicle having a lower seat assembly and an upwardly extending seat back assembly, the upwardly extending seat back assembly comprising;

a seat back frame comprising an upper cross member extending between an inboard lateral side rail of the seat back frame and an outboard lateral side rail of the seat back frame, a forward soft trim carrier assembly adapted for attachment to a forward portion of the seat back frame;

a seat back panel and closeout assembly attached to a rearward portion of the seat back frame; and an adapter carrier operably coupled with the seat back frame and disposed between the forward soft trim carrier assembly and the seat back panel and closeout assembly, wherein the adapter carrier further comprises:

a composite upper portion coupled with the upper cross member of the seat back frame; and a first downwardly depending frame attachment bracket coupled with a lower inboard lateral side of the composite upper portion of the adapter carrier at first end and a lower portion of the inboard lateral side rail of the common seat back frame at a second end and a second downwardly depending frame attachment bracket coupled with a lower outboard lateral side of the composite upper portion of the adapter carrier at first end and a lower portion of the outboard lateral side rail of the seat back frame at a second end;

wherein the upper cross member comprises a pair of head restraint guide sleeve receivers and the composite upper portion of the adapter carrier comprises a pair of sleeve openings that align with the pair of head restraint guide sleeve receivers, and a one of a pair of head restraint guide sleeves are received within a one of each of the pair of head restraint guide sleeve receivers and extends through a one of the pair of sleeve openings in the composite upper portion of the adapter carrier, whereby the composite upper portion of the adapter carrier is coupled with an upper cross member.

\* \* \* \* \*